F. J. BRIGGS.
COTTON PICKER.
APPLICATION FILED APR. 3, 1909.
966,992.
Patented Aug. 9, 1910.
3 SHEETS—SHEET 1.
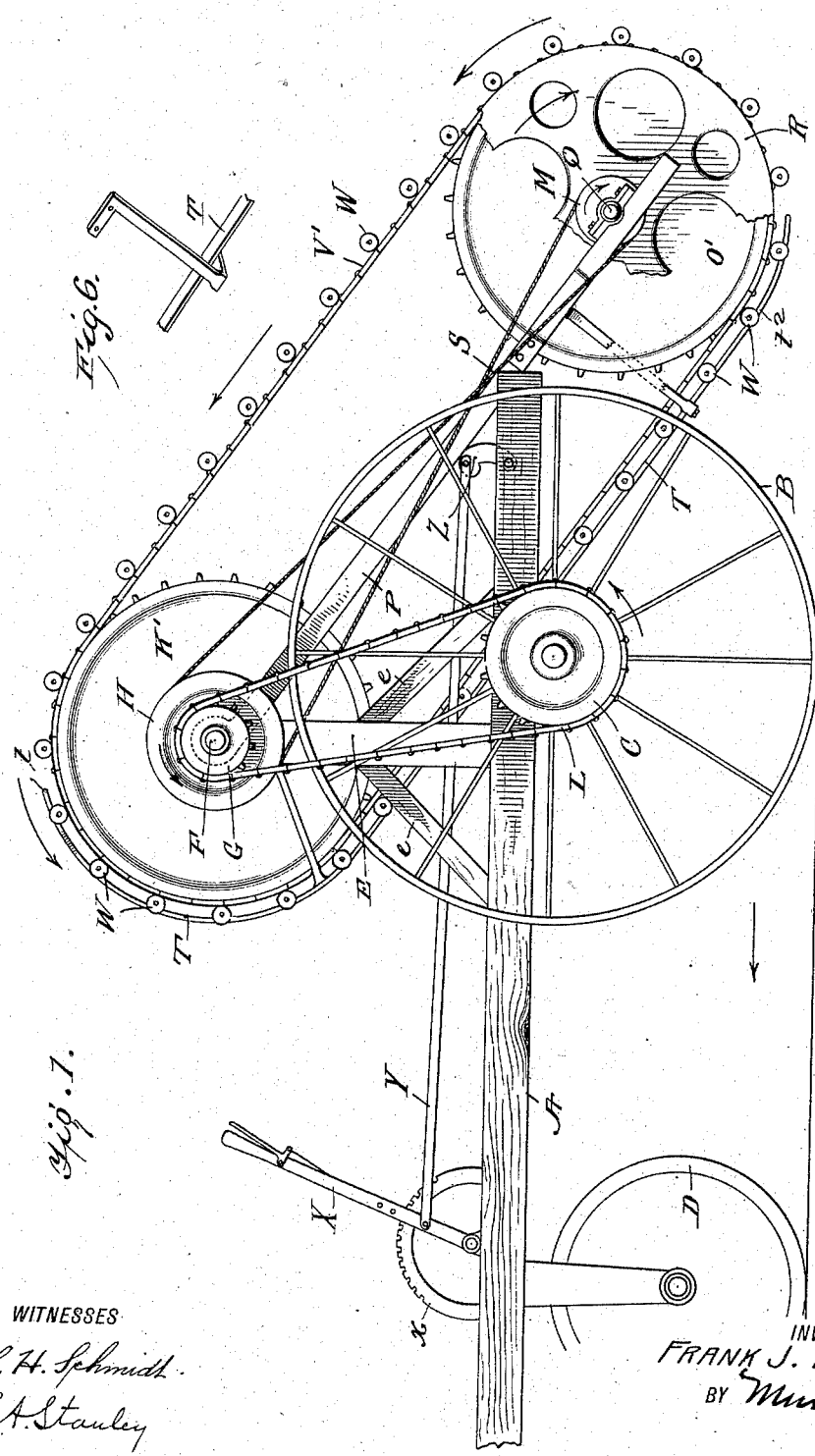
WITNESSES
L. H. Schmidt.
L. A. Stanley
INVENTOR
FRANK J. BRIGGS,
BY Munn & Co.
ATTORNEYS

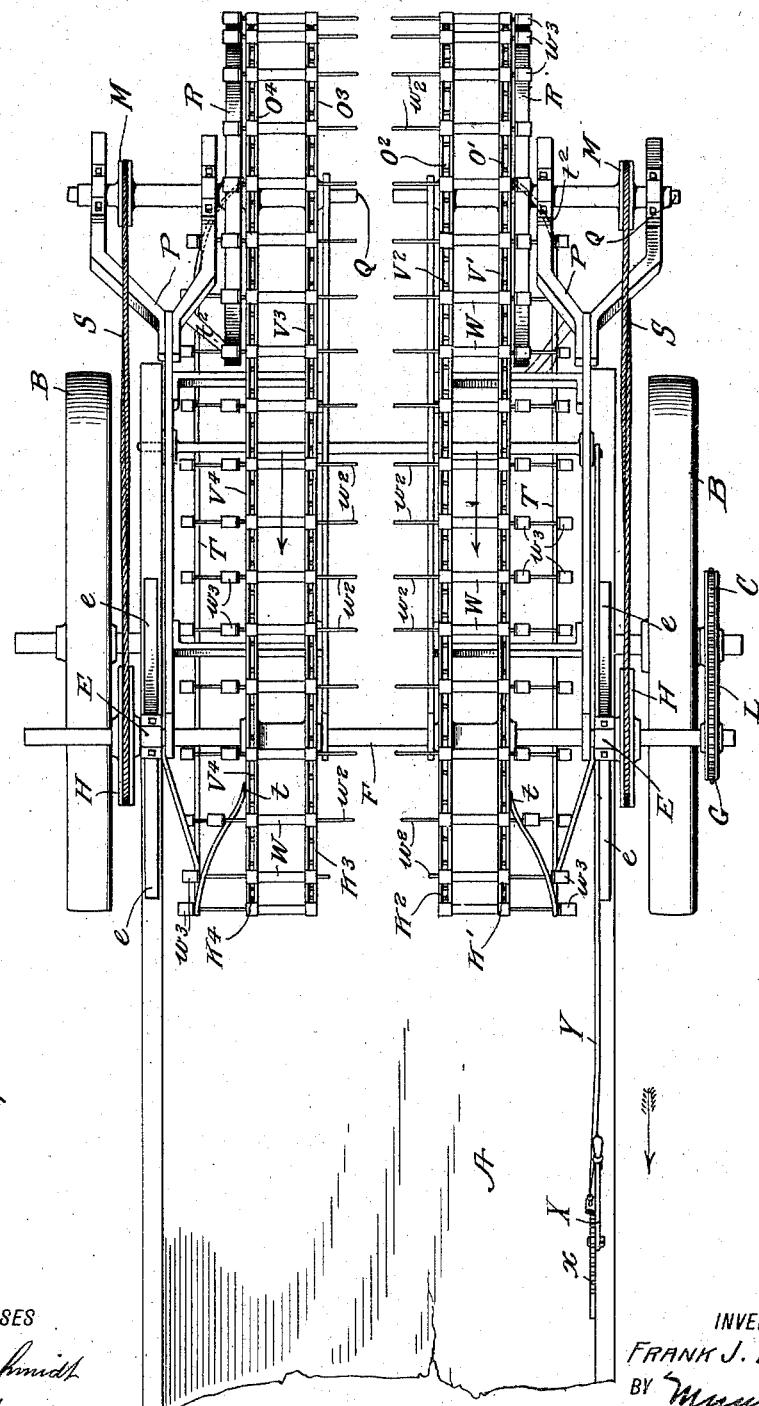

F. J. BRIGGS.
COTTON PICKER.
APPLICATION FILED APR. 3, 1909.
966,992.
Patented Aug. 9, 1910.
3 SHEETS—SHEET 3.
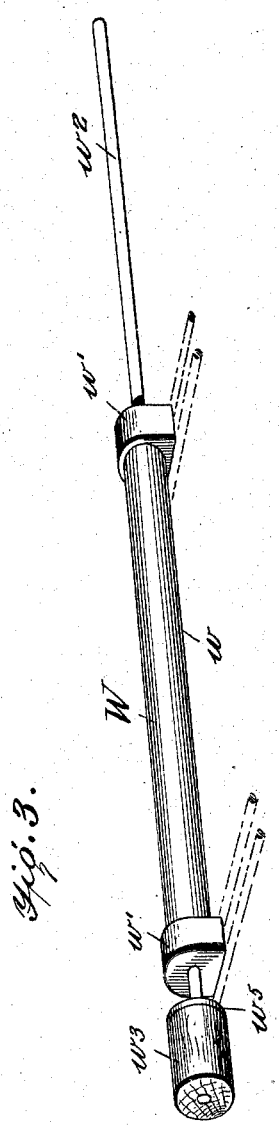
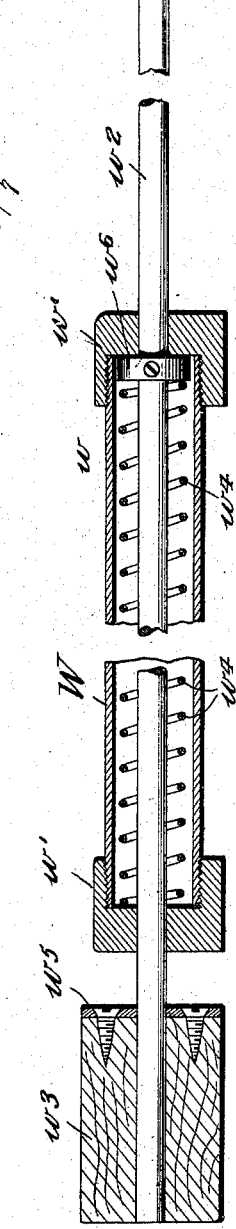
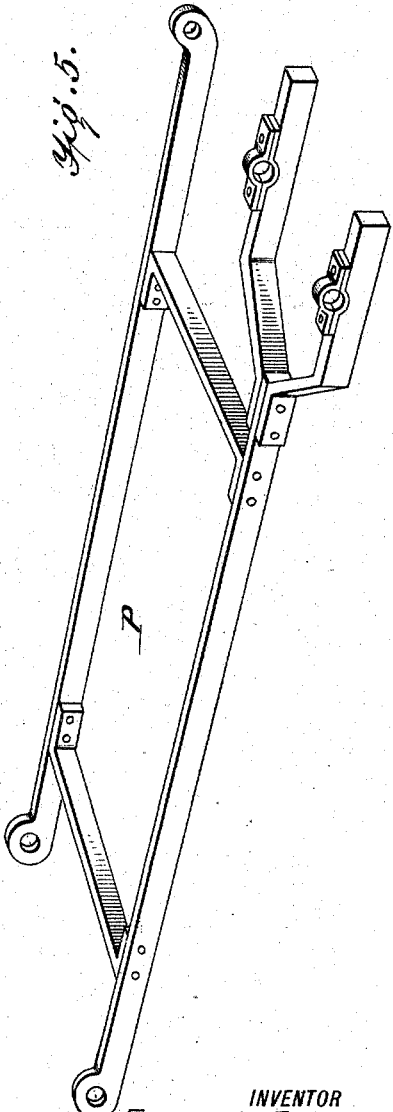
WITNESSES
L. H. Schmidt
L. A. Stanley
INVENTOR
Frank J. Briggs,
BY Munn & Co.
ATTORNEYS

UNITED STATES PATENT OFFICE.

FRANK J. BRIGGS, OF GLENCOE, OKLAHOMA.

COTTON-PICKER.

966,992. Specification of Letters Patent. Patented Aug. 9, 1910.

Application filed April 3, 1909. Serial No. 487,608.

*To all whom it may concern:*

Be it known that I, FRANK J. BRIGGS, a citizen of the United States, and a resident of Glencoe, in the county of Payne and State of Oklahoma, and whose post-office address is as above, have invented a certain new and useful Improvement in Cotton-Pickers, of which the following is a specification.

My invention relates to means for gathering cotton in the field and it consists in the combinations, constructions and arrangements herein described, and claimed.

An object of my invention is to provide a device by which the cotton may be picked from the plants by mechanical means and in which the picking operation may be conducted with thoroughness and despatch.

A further object of my invention is to provide a picker of novel construction which engages the cotton as the machine is passed over the cotton plants drawing the cotton from the bolls and automatically discharging it into the proper receptacle.

A further object of my invention is to provide a cotton picking device in which the operating parts may be readily raised or lowered to accommodate plants of different heights by a simple cam and lever mechanism.

Other objects and advantages will appear in the following specification and the novel features of the device will be particularly pointed out in the appended claims.

My invention is illustrated in the accompanying drawings forming a part of this specification in which similar reference characters indicate like parts in the several views, and in which—

Figure 1 is a side view of my improved cotton picker. Fig. 2 is a plan view thereof. Fig. 3 is a detail perspective view of one of the picker arms. Fig. 4 is a central sectional view of a picker arm and Fig. 5 is a perspective view of the swinging frame. Fig. 6 is a detail view in perspective showing the means for supporting the cam rail.

Referring now more particularly to Figs. 1 and 2, I have shown therein a main supporting frame A provided with the driving wheels B, bearing the sprocket C, the forward part of the frame being supported by wheels D. Toward the end of the supporting frame A near the wheels B are located the uprights E which are held in position by the braces $e$. Upon the uprights E is rotatably mounted a shaft F which bears the sprocket wheel G, the pulleys H and the four sprocket wheels K', $K^2$, $K^3$ and $K^4$. A sprocket chain L passing over the sprocket wheels G and C conveys the power from the latter to the shaft F.

Pivotally secured to the shaft F are the frames P which are of the form shown in Fig. 5. A shaft Q passes through alined bearings in the front ends of the frames P. The shaft Q carries the pulleys M and the friction rollers R and is rotated by means of rope drives S. The shaft Q also carries the four loosely mounted sprocket wheels O', $O^2$, $O^3$ and $O^4$ which are connected to the sprocket wheels K', $K^2$, $K^3$ and $K^4$ respectively by means of the sprocket chains V', $V^2$, $V^3$ and $V^4$. Secured to the frame P are the cam rails T.

The picker arms W for gathering the cotton are illustrated in detail in Figs. 3 and 4. Each one comprises a hollow cylinder $w$ terminating in the end blocks $w'$. Arranged to pass through the cylinder is a rod $w^2$ provided with a collar $w^5$. One end of the rod is securely fastened to a cam block or roller $w^3$ while the other end is arranged to project outwardly and constitutes the picker proper. Within the cylinder $w$ is a spiral spring $w^4$ which keeps the arm $w^2$ normally in an outwardly extended position.

As will be seen from Fig. 2 the picker arms W are secured to the parallel sprocket chains in two rows with their operating ends turned toward each other. The rollers $w^3$ are arranged to make frictional contact with the friction rollers R and the inner ends $w^6$ of the rollers $w^3$ are adapted to engage the cam rails T to pull the picker arms $w^2$ inwardly as will be hereinafter explained. The cam rails T are secured to the auxiliary frame by means of the L-shaped supports $q$ as shown in Fig. 6. This permits the ends of the rollers W to pass the supports.

In order to raise or lower the picking device, I have provided the lever X which has the arc-shaped locking means $x$ and is connected by the link Y to the pivoted cam member Z carried on the front end of the supporting frame A. The cam member Z is arranged to contact with the under part of the frame P to raise or lower the latter according as the lever X is pushed forwardly or drawn rearwardly.

From the foregoing description of the various parts of the device, the operation thereof may be readily understood.

The machine may be propelled in any convenient manner and is guided along the rows of cotton plants which enter between the inwardly turned arms $w^2$, as the machine progresses. These arms are rapidly revolving due to their engagement with the friction rollers R and coming in contact with the cotton they draw the same out of the bolls and carry it upwardly, as shown in Fig. 1. As soon as the heads $w^3$ come in contact with the cam rail T which is at the point $t$, see Fig. 1, the arm $w^2$ is retracted and the cotton which is accumulated thereon is forced off into the appropriate receiver. The spring arm $w^2$ is held in its retracted position until it again comes into its operating position when the curvature of the rail at $t^2$, see Fig. 1, permits the head $w^3$ to again engage the friction wheel R to cause the rapid revolution of the picker arm.

In case the picking device is to be raised or lowered to accommodate plants of different heights, this may be accomplished by means of the lever X and the cam Z in the manner heretofore described.

I am aware that other forms of the device based upon the same general idea might be made, but I consider as my own all such modifications as fairly fall within the spirit and scope of the invention.

I claim:—

1. In a cotton picker, a hollow cylinder, a spring disposed in said cylinder, a slidable arm arranged to be controlled by said spring and provided with a head, means arranged to engage said head for causing the rotation of said picker arm and means arranged to engage said head for causing the retraction of said arm against the tension of the spring.

2. In a cotton picker, a main frame, an auxiliary frame pivoted thereto, a series of sprocket wheels mounted at each end of said auxiliary frame, sprocket chains therefor, a series of picker arms secured to said sprocket chains, a friction roller secured at one end of said auxiliary frame and adapted to engage said picker arms to cause the rotation of the latter, and means for raising and lowering said pivoted frame.

3. In a cotton picker, a hollow cylinder, a spring disposed in said cylinder, a slidable picker arm arranged to be controlled by said spring and provided with a head, a friction wheel arranged to engage said head for causing the rotation of the picker arm and a cam rail arranged to engage said head for causing the retraction of said arm against the tension of the spring.

4. In a cotton picker, a hollow cylinder, a spring disposed in said cylinder, a slidable arm arranged to be controlled by said spring, one end of said arm being adapted to engage the growing cotton, the opposite end being provided with a head, a friction wheel, a sprocket chain for supporting said cylinder arranged to bring said head into periodical engagement with said friction wheel and a cam rail arranged to engage said head for causing the retraction of said arm against the tension of the spring.

5. In a cotton picker, a main frame, an auxiliary frame pivoted thereto, a series of sprocket wheels mounted at each end of said auxiliary frame, sprocket chains therefor, a series of picker arms secured to said sprocket chains, a friction roller secured at one end of said auxiliary frame and adapted to engage said picker arms to cause the rotation of the latter, a cam member pivoted on said main frame normally in engagement with said auxiliary frame and means for operating said cam to cause the raising and lowering of said auxiliary frame.

FRANK J. BRIGGS.

Witnesses:
TERRY MARLIN,
J. L. STUART.